United States Patent Office 3,114,623
Patented Dec. 17, 1963

3,114,623
UPGRADING OF PHOSPHATE ORES
Carmela Ben-Ari and Dov Ben-Ari, Ramat Gan, Israel, assignors to Negev Phosphates Limited, Hakirya, Tel Aviv, Israel
No Drawing. Filed Sept. 20, 1960, Ser. No. 57,131
Claims priority, application Israel Jan. 20, 1960
2 Claims. (Cl. 71—44)

The present invention concerns the upgrading of calcium-carbonate-containing phosphate ores.

Various processes have already been suggested for the upgrading of calcium-carbonate-containing phosphate ores. According to some of them a considerable proportion of the calcium carbonate is removed by flotation while according to others the rock phosphate is calcined whereby the calcium carbonate is converted into calcium oxide, and thereafter slaked, either with so much water that the calcium oxide is just converted into hydroxide but remains dry, or with an excess of water, and the slaked lime is separated from the phosphate. This separation is difficult and requires in many instances heavy and expensive equipment, and even so it is usually incomplete.

Starting from a rock phosphate having a $P_2O_5$ content of about 22%, known upgrading processes usually increase the $P_2O_5$ content to not above 30–34%. It is, however, desirable to concentrate the rock phosphate still further so that as little ballast as possible has to be handled in transport and storage, and the subsequent processing of the rock phosphate into fertilizers or phosphoric or phosphorous acids and their derivatives is both facilitated and made cheaper owing to the reduced acid requirement for the decomposition of the phosphate.

It is accordingly the object of the present invention to provide a process by which high-grade rock phosphate can be obtained by the upgrading of low-grade phosphate.

The invention is based on the surprising observation that when the quicklime contained in calcined rock phosphate is slaked with so much water that the entire mass forms a slurry, and this slurry is boiled, a very fine aqueous suspension of slaked lime (milk of lime) is obtained which can readily be separated, e.g. by decantation, from the phosphate and any gangue (other than calcium carbonate) accompanying the latter.

Accordingly the invention consists in a process for the upgrading of calcium-carbonate-containing rock phosphate is calcined, the calcined mass is slurried in water, the slurry is boiled, and the supernatant suspension of calcium hydroxide is separated from the sediment.

The water can be brought to boiling by any suitable method, e.g. by external heating or by the introduction of steam. Preferably, the slurry is agitated during boiling, e.g. by stirring.

It has been found that a relatively low-grade rock phosphate containing, for example, 23% of $P_2O_5$, can be upgraded to a $P_2O_5$ content of 39%. So high a grade cannot be achieved by any known process.

The concentrating process according to the invention may be applied to both native rock phosphate and rock phosphate previously enriched in any conventional manner, e.g. by flotation.

An adequate average time for boiling the slurry is of the order of 20 to 30 minutes, but it will have to be chosen according to the properties of the material. In some cases shorter boiling periods will be sufficient while in other cases longer periods may be required.

The quality of the water used for slaking is not a critical factor. Where available, soft water is preferable, but it is also possible to use brackish water, which term includes sea water.

The invention is illustrated by the following examples without being limited thereto.

Example 1

Crude rock phosphate from Oron (Israel) containing 23% of $P_2O_5$ and 37.4% of $CaCO_3$ was submitted to a preliminary enrichment by flotation whereby the $P_2O_5$ content was increased to 30%, corresponding to a tricalcium phosphate content of 65.4%, while the $CaCO_3$ was brought down to 22.7% which corresponds to a $CO_2$ content of 10%.

This product was calcined at 960° C. for two hours whereby the $CaCO_3$ was decomposed and the liberated $CO_2$ was expelled, but for a residual $CO_2$ content of 0.2%. The calcined mass was slurried in five times its weight of water and the slurry was boiled for 20 minutes. There resulted a supernatant fine suspension of slaked lime and a sediment of rock material. The suspension was removed by decantation, the residue re-slurried, allowed to settle, and the supernatant suspension again removed by decantation. This was repeated several times and there was thus obtained an enriched rock phosphate containing 39% $P_2O_5$, corresponding to a tricalcium phosphate content of 85%.

Example 2

Rock phosphate (cyclone rejects) from Oron (Israel) containing 23.9% of $P_2O_5$ and 34.7% of $CaCO_3$, was submitted to a preliminary enrichment by flotation whereby the $P_2O_5$ content was increased to 31.4%, corresponding to a tricalcium phosphate content of 68.4%, while the $CaCO_3$ was brought down to 19.5% which corresponds to a $CO_2$ content of 8.6%. This product was calcined at 960° C. for two hours whereafter the residual $CO_2$ content amounted to 0.3%. The calcined mass was slurried in five times its weight of sea water and the slurry was boiled for 20 minutes. There resulted a supernatant fine suspension of slaked lime and a sediment of rock material. The suspension was removed by decantation, the residue reslurried, allowed to settle, and the supernatant suspension again decanted. This was repeated several times and there was thus obtained an enriched rock phosphate containing 38.0% of $P_2O_5$, corresponding to a tricalcium phosphate content of 82.8%.

Example 3

Rock phosphate from Oron (Israel) mechanical beneficiation plant containing 28.5% of $P_2O_5$ and 25.7% of $CaCO_3$ was calcined at 960° C. for two hours whereafter the residual $CO_2$ content amounted to 0.5%. The calcined mass was slurried in five times its weight of water and the slurry was boiled for 20 minutes. There resulted a supernatant fine suspension of slaked lime and a sediment of rock material. The suspension was removed by decantation, the residue re-slurried, allowed to settle, and the supernatant suspension again decanted. This was repeated several times and there was thus obtained an enriched rock phosphate containing 38.7% of $P_2O_5$ corresponding to a tricalcium phosphate content of 84.4%.

Example 4

Rock phosphate (coarse rejects) from Oron (Israel) mechanical beneficiation plant containing 21.4% of $P_2O_5$ and 39.3% of $CaCO_3$ was calcined at 960° C. for two and a half hours whereafter the residual $CO_2$ content amounted to 0.2%. The calcined mass was slurried in five times its weight of water and the slurry was boiled for 20 minutes. There resulted a supernatant fine suspension of slaked lime and a sediment of rock material. The suspension was removed by decantation, the residue re-slurried, allowed to settle, and the supernatant suspension again decanted. This was repeated several times and there was thus obtained an enriched rock phosphate containing 38.2% of $P_2O_5$ corresponding to a tricalcium phosphase content of 83.3%.

We claim:
1. A process for producing, from a starting material containing calcium carbonate and at least approximately 22% of $P_2O_5$ in the form of rock phosphate, a product with a $P_2O_5$ concentration in excess of 34%: consisting essentially in the steps of
  calcining the starting material at a temperature of at least about 900° C., thereby forming a calcined product in which the calcium carbonate is converted into quicklime;
  adding an amount of water to the calcined product which is substantially in excess of the stoichiometric amount required for hydration of the quicklime, thereby forming a fluid slurry of the calcined product;
  boiling said slurry by further heating thereof, thereby producing a supernatant fine suspension of slaked lime and a sediment containing rock phosphate in relatively high concentration;
  separating said suspension containing the slaked lime from said sediment; and
  recovering said sediment containing in excess of 34% of rock phosphate.
2. A process as in claim 1; further comprising the step of agitating the slurry during said boiling thereof.

References Cited in the file of this patent
UNITED STATES PATENTS

| | | |
|---|---|---|
| 1,453,571 | Stevenson | May 1, 1923 |
| 1,880,491 | Rothe et al. | Oct. 4, 1932 |
| 1,895,505 | Wuensch | Jan. 31, 1933 |

OTHER REFERENCES

"Deco Trefoil," publication by the Denver Equipment Co., September–October 1954 edition, page 11.

"Chemical Abstracts," vol. 46, 1952, column 8794a.